Nov. 30, 1926. Re. 16,490
J. P. RATIGAN
GRIP
Original Filed Feb. 16, 1925
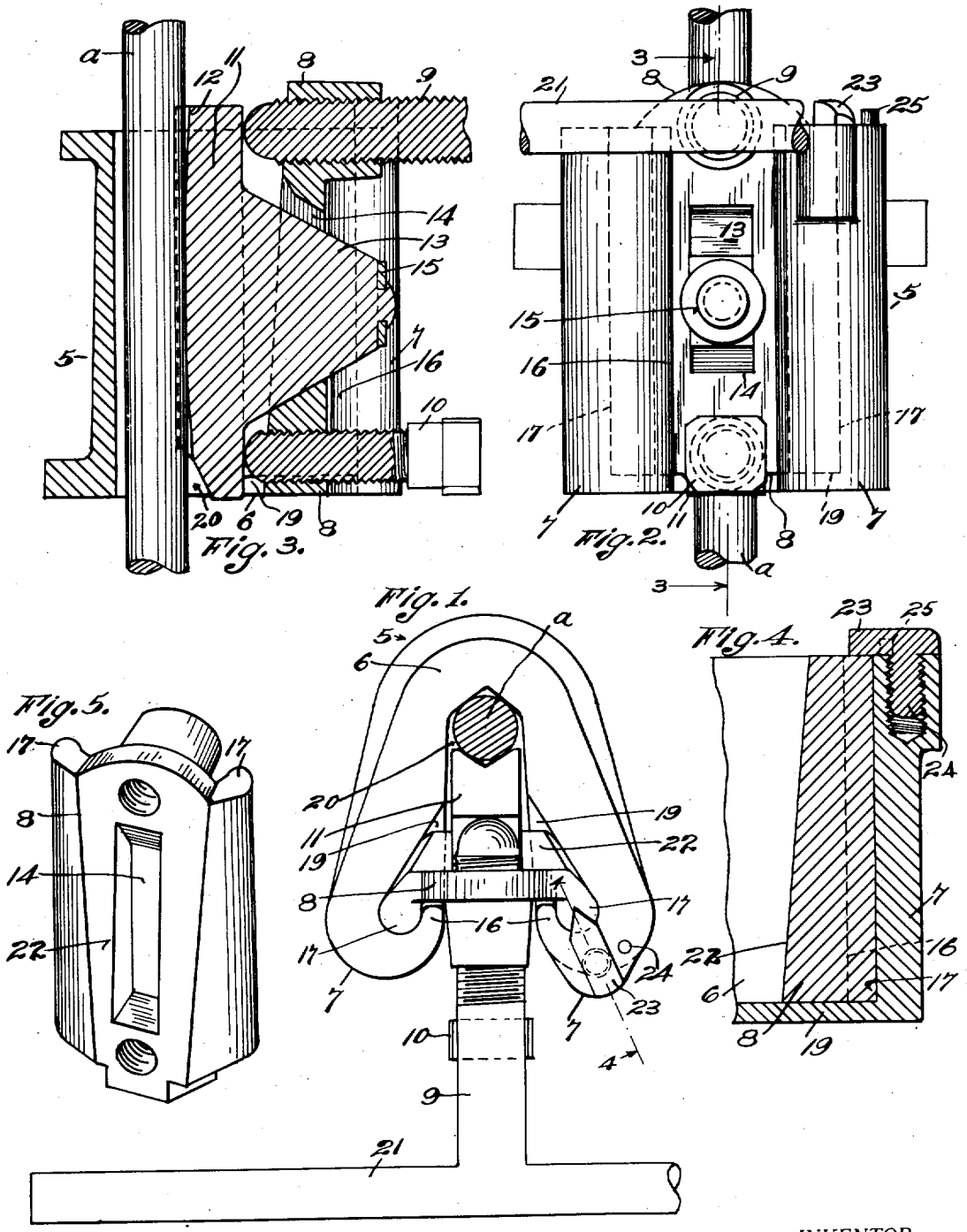
INVENTOR,
James P. Ratigan;
BY
F. E. Maynard,
ATTORNEY.

Reissued Nov. 30, 1926. Re. 16,490

UNITED STATES PATENT OFFICE.

JAMES P. RATIGAN, OF LOS ANGELES, CALIFORNIA.

GRIP.

Original No. 1,562,053, dated November 17, 1925, Serial No. 9,508, filed February 16, 1925. Application for reissue filed May 6, 1926. Serial No. 107,280.

This invention relates to gripping devices and more especially to screw clamps of a type called "grips".

While the present grip has a variety of useful purposes it is particularly adaptable to what are known in the oil fields, as "polish rods" for plunger pumps. The grip connects the polish rod to the usual pump beam.

An object of my present invention is to provide a grip body with a free and unobstructed channel along one side so that the grip body can be slapped quickly and easily against the polish rod immediately following which a complementary gate, carrying a gripping jaw, can be dropped onto a seat-part in the body, following which setting screws are operated to jam the jaw on the rod.

An object is to provide a grip whose parts are very simple, substantial and comprise but two wholly separable units, which are so constructed, and cooperative that when the channel body has been slipped onto the rod by one hand the other unit or gate can be dropped into closing position and will be supported on the grip body (held by one hand) while set screw means are operated by the other hand to force in the clamp jaw. The advantage of this is that the pump man can drop the gate into place without fear of its passing through the channel and does not have to hold the gate itself while he is running in the set screws.

An important object is to provide an open side grip body and a wholly removable gate of such design, arrangement and construction that they interlock in a manner to prevent disastrous spreading of the side walls under reaction of clamp pressures.

Another object is to provide a detachable gate carrying an associated movable clamping jaw in interconnected relation therewith.

Other objects and advantages will be made apparent in the ensuing specification of apparatus, herewith illustrated, embodying a form of the invention; it being understood that modifications, variations and adaptations may be resorted to within the spirit and scope of the invention as here claimed.

Figure 1 is a plan of the grip; the introduced rod being in section;

Figure 2 is a front elevation of the applied grip;

Figure 3 is a longitudinal section of the applied grip (on line 3—3, Fig. 2);

Figure 4 is a section on line 4—4 Fig. 1;

Figure 5 is a perspective of the gate element.

The grip, as illustrated, includes a structure 5 comprising a main body part 6 having a channel shape presenting generally parallel side wings 7 which have rounded outer edges forming a wide, clear, convergent mouth for the ready entrance of the element or object which is to be gripped, and here shown as a pump polish rod *a*. The rod is solidly received along the bottom or valley of the longitudinal channel 20 between the rings 7; this channel being slightly wider than the rod.

After the grip body has been laid against the rod *a* the channel is closed by a movable gate part 8 which has along its outer parallel edges a set of half round beads 17 which slip easily down into the corresponding bights of inwardly facing lips 16 (Fig. 1) along the mouth of the body. At the bottom of lips 16 are stop webs 19 (Fig. 4) joined to the bottom of the body 6. These webs do not project into the channel and do not obstruct entrance by the rod, and are provided for the purpose of supporting the gate 8 when this is dropped in and fully released from the hand of the pump man who is applying the grip.

This leaves the hand free for use in turning in screws 9 and 10 which are mounted in the upper and lower ends of the gate 8; the screw 9 being shown as having a handle 21 for leverage purposes.

The screws 9 and 10 press against a gripping jaw 11 having an effective, longitudinally grooved face 12 which is here shown as longitudinally convexed, though not necessarily so. The outer side of the jaw 11 has a tongue 13 extending into a slot 14 in the gate and having a suitable cross piece 15 to loosely interconnect the jaw with the gate to prevent loss by dislodgement.

To permit the jaw 11 to tip back, if so desired, the inner face 22 of the gate 8 is slanted inwardly and downwardly, as shown in Fig. 4.

The top of the body 6 has a latch 23 pivoted at 24 to swing in over the near corner of the gate 8 and retain it against loss. When it is desired to remove the gate entirely the latch 24 is swung out against a stop pin 25.

After the open grip body has been laid against the polish rod, the gate is dropped down in the guideways in the side wings 7 and the set screws 9 and 10 are then run in to set the jaw against the rod *a* and clinch this against the bottom of channel 20. A reversal of this operation releases the parts for removal from the rod.

It will be seen that the beads 17 interlock in the guideways or bights along the lips 16 and the beads react outwardly and center themselves in the bights and positively prevent the side wings from being forced apart when the pressure of the screws forces the gate outward. The webs 19 tie the lips 16 of the mouth to the body wings and, as above stated, support the gate before the screws are run in.

What is claimed is:

1. A grip comprising a body formed in sections, one section being channeled and the other section forming a wall for the open side of the channel and being movably secured to the first mentioned section, a screw threaded through one of the sections and projecting into the channel, and cooperating parts between the sections tending to pull the side walls of the channeled member toward each other when the screw is tightened.

2. A grip comprising a body formed in sections, one section being channeled and the other section forming a wall for the open side of the channel and being movably secured to the first mentioned section, a grooved block loosely mounted in the channel, a screw threaded through one of the sections and projecting into the channel, and cooperating parts between the sections extending to pull the side walls of the channeled member toward each other when the screw is tightened.

3. A grip comprising a body formed in sections, one section being channeled and having hook-shaped jaws and the other section having projections engaging the bights of the hook-shaped jaws, and a screw threaded through one of the sections and projecting into the channel.

4. A grip comprising a channeled body, a grooved block in the channel, the wall of the groove being convex longitudinally of the block, means to force one end of the block toward the wall of the channel, and means to force the other end of the block toward the wall of the channel.

5. A grip comprising a channeled body, a grooved block in the channel, the wall of the groove being convex longitudinally of the block, and screws threaded into the body, one screw engaging the block near one end and the other screw engaging the block near its opposite end.

6. A grip comprising a channeled body adapted to receive a rod, screws threaded into the body and projecting into the channel and a block engaged at its end portions by the screws and having a face engaging the rod only at a portion intermediate of the end portions to equalize pressure of the screws on the block.

7. A grip comprising a body formed in sections, one section being channeled to receive a rod, the other section having a longitudinally extending slot, a block having a tongue inserted in the slot, and means on one of the sections to force the block toward the rod.

8. A grip comprising a body formed in sections, one section being channeled to receive a rod, the other section having a longitudinally extending slot, a block having a tongue inserted in the slot, there being a shoulder on the tongue to engage one of the marginal walls of the slot, and means on one of the sections to force the block toward the rod.

9. A grip comprising a body formed in relatively movable sections, one of the sections having a channel to receive a rod, the other section closing the open side of the channel, one of the sections having its inner face extending aslant downwardly and inwardly, a block in the channel, and means on one of the sections to force the block away from the slanting face toward the rod.

10. A grip comprising a body formed in relatively movable sections, one of the sections having a channel to receive a rod, the other section closing the open side of the channel and in sliding engagement with the first mentioned section, one of the sections having its inner face extending aslant downwardly and inwardly, a block in the channel, and means on one of the sections to force the block away from the slanting face toward the rod.

11. A grip including a channeled body section having its side walls provided with inwardly projecting hook-shaped jaws forming bights along the side walls, a gate section extending between the side walls and having projections to engage in the bights, and adjustable means on one of the sections to force a rod in the channel toward the other section.

12. A grip comprising a body section having a rod channel along one side, a movable gate section for closing the open side of the channel, and adjustable means mounted on one section and operative to force a rod in the channel toward the other section; said means acting in opposite directions on the sections.

13. A grip including a channeled body section to receive an object to be gripped, and a movable gate section, carrying an adjustable gripping device, closing the channel in the body and interlocked in the side walls thereof to prevent spreading of the side walls when the object is effectively clamped in the channel by the gripping device.

14. A grip including a body constructed to entirely surround the inserted object to be clamped and having a channeled side for entrance of said object, and having a gate section loosely fitting in the body and interlocking with its channel walls to prevent spreading thereof when the grip is set, and an adjustable object clamping part projecting into the body channel and being adjustable on said section.

15. A grip including a channeled body for side entrance of an object to be gripped, and an entrance closing gate having an effective object clamping part and being readily movable out of the entrance to permit relative lateral application to said object, and means engaged by the gate for preventing spreading of the side walls of the channel when the grip is set on said object and a screw means for effecting a gripping of the object in the channel between and by said body and said part.

16. A grip including an open channel body for an object to be gripped, a movable side gate to close the channel after insertion of the object and having an object clamping part, manually adjustable means for effecting the gripping of the object by said body and said part and means for supporting the gate in the channel before the grip is set.

17. A grip including an open channel body for an object to be gripped, a movable side gate to cross connect the channel sides after insertion of the object; and having a part to clamp the object, said body having guideways for edges of the gate, and gate stops in the guideways and means for setting said part adjustably against the object.

18. A grip comprising a channeled body member open along one side from end to end, a gripping block in the channel, a front wall section mounted in and closing the channel, means for effecting a gripping action of the block, and means for preventing spreading of the side walls of the channel by the wall section when the block is set.

19. An open-side grip body having grooved lips along its open side, and a gate interlocking with the grooved lips to prevent lateral spread of the body and adjustable gripping means to clamp an interposed object by reaction of said gate and grip body.

20. An open-side grip body having grooved lips along its open side, and a gate interlocking with the grooved lips and carrying adjustable means to clamp an interposed body; said lips being connected to the body by cross webs forming gate stops.

21. An open-side grip body having grooved lips connected to the body by stop webs in the lower ends of the grooves, and a movable gate interlocked with the grooved lips and engageable, when free, by the webs, and a screw actuated gripping block carried by the gate and whereby a rod is gripped after the gate rests on the stop webs.

22. In a grip, a body including wall sections forming a rod chamber and mutually interlocking when pressed apart laterally, one section having means to prevent spreading of the engaged portions of the other, and one section of the body having adjustable clamping means to engage an interposed rod and effect an interlocking action of the sections; said clamp means being interposed between and oppositely reacting on the sections to cause their interlock.

23. A grip comprising a channeled body member open along one side from end to end, a gripping block in the channel, a movable front wall section closing the channel, adjustable means to set the block in gripping action, and means for preventing spreading of the side walls of the channel by said section when the block is set.

24. A grip including a body formed in sections, one section being channeled and the other forming a wall for the open side of the channel, clamping adjustable means mounted on one section and projecting into the channel, and cooperating parts between the sections operative to prevent spreading of the side walls of the channeled section when the clamping means is set, said means acting in opposite directions against said sections to cause a relative separating movement thereof and effect interlock of the parts.

25. A grip including a body formed in sections, one section being channeled and the other section being insertable in the channel and having an aperture, a block having a part inserted in said aperture, and means for pressing the block against the object, in the channel, to be gripped.

26. A grip including a body channeled along one side, a block in the channel and having a longitudinally extending, grooved, gripping face opposed to the channel bottom, a section supported on the side walls of the channel and carrying the block and being movable to uncover the channel, and means for clamping the block against the object to be gripped.

27. A grip including a body member channeled along one side from end to end and having inwardly turned lips spaced from the body to form guideways, and a gate member to close the channel and having beads hooking in said guideways to interlock with and prevent lateral movement of the side walls of the channel and adjustable means, on one of said members, extending into the channel and operative to grip an interposed object and by reaction effect an interlock of the members.

In testimony whereof I have set my hand.

JAMES P. RATIGAN.